United States Patent [19]
Allinson

[11] Patent Number: 5,674,008
[45] Date of Patent: Oct. 7, 1997

[54] PULSED TEMPERATURE MONITORING CIRCUIT AND METHOD

[75] Inventor: Damian Paul Allinson, West Yorkshire, Great Britain

[73] Assignee: Switched Reluctance Drives, Ltd., England

[21] Appl. No.: 484,711

[22] Filed: Jun. 7, 1995

[30] Foreign Application Priority Data

Mar. 22, 1995 [GB] United Kingdom ............... 9505769

[51] Int. Cl.[6] .................... G01K 13/00; G01K 7/22
[52] U.S. Cl. ...................... 374/183; 374/141; 310/68 C
[58] Field of Search ............................ 374/183, 141, 374/163; 310/68 C

[56] References Cited

U.S. PATENT DOCUMENTS

| | | | |
|---|---|---|---|
| 3,139,753 | 7/1964 | Brudner | 374/183 |
| 4,041,382 | 8/1977 | Washburn | 374/183 |
| 4,068,526 | 1/1978 | Goldstein . | |
| 4,204,429 | 5/1980 | Shimazaki et al. . | |
| 4,571,095 | 2/1986 | Stoffels | 374/183 |
| 4,627,745 | 12/1986 | Rider | 374/183 |
| 5,351,010 | 9/1994 | Leopold et al. | 374/183 |

FOREIGN PATENT DOCUMENTS

| | | | |
|---|---|---|---|
| 2608815 | 6/1988 | France | 374/183 |
| 43 31 250 | 9/1994 | Germany . | |
| 0118258 | 9/1979 | Japan | 374/183 |
| 1560989 | 4/1990 | U.S.S.R. | 374/183 |

OTHER PUBLICATIONS

Abstract of JP 7027630, Izumi, Jan. 31, 1995.
Abstract of JP 57131029, Kiyoo, Aug. 13, 1982.
Abstract of JP 5332848, Koji, Dec. 17, 1993.

Primary Examiner—Diego F. F. Gutierrez
Attorney, Agent, or Firm—Arnold, White & Durkee

[57] ABSTRACT

A temperature monitoring circuit comprises a thermistor which is connected with a power supply rail by means of a transistor. The transistor is pulsed to connect the thermistor intermittently in circuit with the power supply. The mean power drawn by the thermistor from the power supply is reduced, causing less drain on the power supply.

12 Claims, 2 Drawing Sheets

5,674,008

PULSED TEMPERATURE MONITORING CIRCUIT AND METHOD

FIELD OF THE INVENTION

This invention relates to a pulsed temperature monitoring circuit and a method of operating a temperature monitoring circuit. The invention is particularly applicable to an electric motor drive system comprising a pulsed temperature monitoring circuit.

BACKGROUND OF THE INVENTION

An application in which a temperature sensitive device could be used is as a temperature sensor in an electric motor drive system. The device is arranged to monitor the working temperature of the motor itself so that the motor controller is able to take this into account. Under normal operating conditions the demand on the motor can be limited if the motor temperature rises beyond an acceptable limit.

Various types of temperature transducers in which an output characteristic of the transducer varies with a change in temperature are known. For example, some transducers are known in which a change in resistivity of a component occurs as the temperature changes. One such type of device is the thermistor which is a resistor typically comprising semi-conductor material. The thermistor has a relatively large and generally non-linear temperature co-efficient of resistance. A generalized illustration of the temperature/resistance characteristic of a notional thermistor is shown in FIG. 1 of the drawings.

Thermistors are often operated in a relatively linear part of the temperature/resistance curve as denoted by the letters a and b in FIG. 1. A thermistor will be chosen for a particular application such that the temperature range coincides with this relatively more linear part of the temperature/resistance curve. Typically, a thermistor in a temperature monitoring circuit will have a regulated fixed supply voltage and be configured in a potential divider network across the supply voltage.

However, it will be clear from FIG. 1 that the overall temperature/resistance characteristic is more of a bathtub shaped curve although this is rarely considered by the thermistor user because the characteristic outside the generally accepted working range is of no interest to the user.

Known thermistors operating across a wide temperature range (e.g. between −20° C. and +80° C.) will swing in resistance between, say 20 ohms and 2 kohms. According to FIG. 1, there is a very large variation in the current drawn from the constant voltage supply across the known potential divider circuit. At low temperatures there is a particularly heavy current drain. Furthermore, a temperature sensing circuit including a thermistor operating over a wide temperature range would have to be designed for the heaviest current situation, i.e. that at low temperatures.

In an extreme environment, such as a refrigerated warehouse or cold store, a loading vehicle driven by an electric motor may need to have its motor temperature monitored over a wide temperature range. In situations in which the motor is operated while in the refrigerated warehouse or the motor is not heavily loaded, the thermistor resistance may be low and the current drain from the regulated supply is increased accordingly.

As part of the motor control system on a battery-operated vehicle there is typically a voltage regulator which derives a lower control circuit voltage from the main battery voltage. If the battery is at or near full charge and the current drain attributable to the thermistor is high, the regulator will be particularly heavily loaded and has to be designed with a capacity such that it will not overheat in the worst cases.

To avoid the regulator overheating it is also known to provide a heat sink to dissipate heat generated by the regulator. Using either a larger capacity regulator or a heat sink requires space in a motor compartment in which space may not be readily available in abundance.

SUMMARY OF THE INVENTION

It is an object of the present invention to provide a temperature monitor for use over a wide temperature range which, on average, draws considerably less current than those known in the prior art.

According to the present invention there is provided a temperature monitoring circuit comprising a temperature sensitive device, having an electrical characteristic that varies with temperature, a power supply, an output terminal which provides an electrical output dependent on the temperature of the temperature sensitive device, a switch arrangement for enabling the monitoring circuit, the switching arrangement being connected between the power supply and the temperature sensitive device, and a controller for actuating the switch means according to repeated enabling pulses.

In one embodiment of the invention, the temperature sensitive device is a thermistor which has a normal temperature operating range based on a relatively linear part of its temperature/resistance curve. According to the invention the full temperature range of the temperature/resistance curve can be utilized, including that part in which the resistance is at its lowest. The pulsing of the monitoring circuit intermittently enables the thermistor and the mean power drawn from the power supply is, therefore, reduced accordingly.

Preferably, the switch arrangement includes a transistor, for example an NPN bipolar transistor.

Also according to the invention there is provided a method of monitoring the temperature of a body using a temperature sensitive device having an electrical characteristic that varies with temperature, the method comprising:

(a) connecting the temperature sensitive device to a power supply;

(b) enabling the temperature sensitive device by means of a switch arrangement according to repeated enabling pulses.

BRIEF DESCRIPTION OF THE DRAWINGS

The present invention can be put into practice in various ways, some of which will now be described by way of example with reference to the accompanying drawings in which.

DETAILED DESCRIPTION OF THE INVENTION

Figure 2:
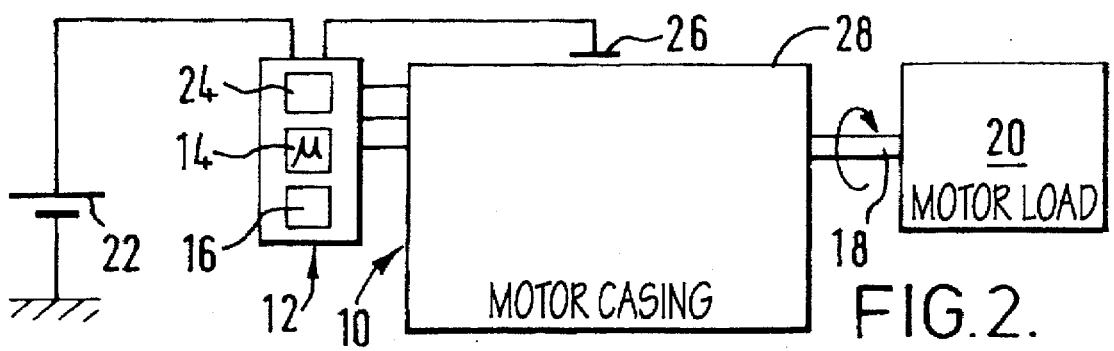
FIG. 2 is a schematic block diagram of a switched reluctance drive system in which the invention is used.

Referring to FIG. 2 of the drawings, a switched reluctance motor drive system comprises a switched reluctance motor 10 which is controlled by a controller 12, comprising a microprocessor 14 and a number of function cards 16, one of which is shown. In this embodiment the microprocessor 14 is a 68HC11 processor which is manufactured by Motorola, Inc. The motor 10 has a shaft 18 which is connected with a load 20. The load 20 could be anything to be rotated by the motor 10 as will be apparent to the skilled person. In a particular application, the load 20 is constituted by the traction wheels of a loading vehicle used in a cold store. Other, perhaps static, applications in an extreme environment or range in temperature (such as motors for conveyor belts in a cold store) are also applicable to the invention.

The motor 10 and the drive system generally are well known in the art and will not be described in further detail here. An example of a description of switched motors and drive systems is the paper: "The Characteristics, Design and Applications of Switched Reluctance Motors and Drives", Stephenson & Blake, PCIM Conference, Jun. 21, 1993, Nurnberg, Germany.

The motor 10 and the controller 12 are supplied from a battery 22 in this embodiment. Of course other sources of electrical power, such as a rectified mains supply, could be used. The output of the battery 22 is regulated to 5 V for the control circuitry by a DC voltage regulator 24. A thermistor 26 is mounted on the casing 28 of the motor 10 to monitor the motor temperature or in the motor winding to monitor winding temperature. The output of the thermistor 26 is relayed to the function card 16.

Figure 3:
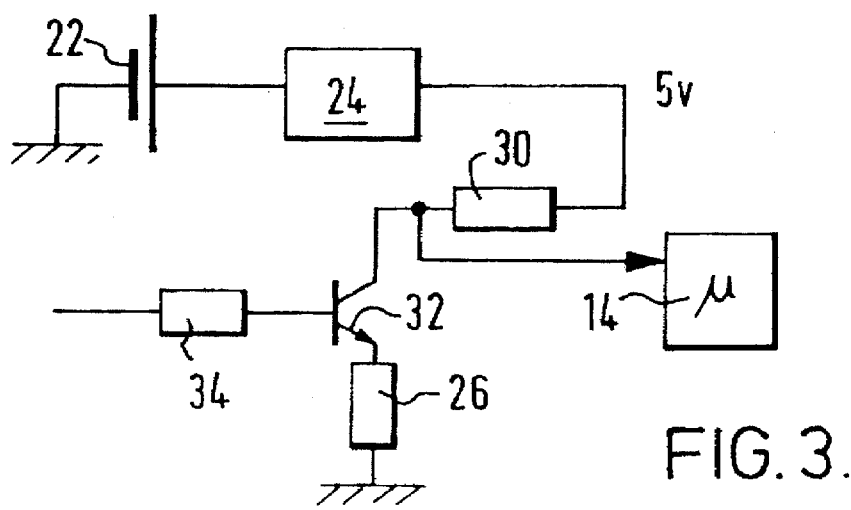
FIG. 3 is a schematic block diagram of a temperature monitoring circuit according to the invention.

FIG. 3 shows the thermistor 26 in circuit. This is, in effect, detail from the card 16 in FIG. 2 except, of course, the thermistor is mounted on the motor casing 28 and the battery 22 is also separately mounted away from the card 16. The regulator 24 provides a stable 5 volt output regardless of the state of charge of the battery.

A resistor 30 is connected with the regulated 5 V supply rail. A NPN bipolar transistor 32 is serially connected between the resistor 30 and the thermistor 26 which is, in turn, connected with ground potential. It will be apparent from FIG. 3 that the collector of the transistor 32 is connected with the resistor 30 and the emitter of the transistor 32 is connected with a thermistor 26. A bias resistor 34 is connected with the base of the transistor 32.

It will be appreciated by the person skilled in the art that other types of semi-conductor switch, such as a field effect transistor, or an electro-mechanical switch, such as a reed relay could be used in place of the transistor 32 in certain applications to equal effect. It will also be appreciated that the thermistor could be mounted on a piece of equipment other than the motor, e.g. a heatsink for power switching devices.

Figure 1:
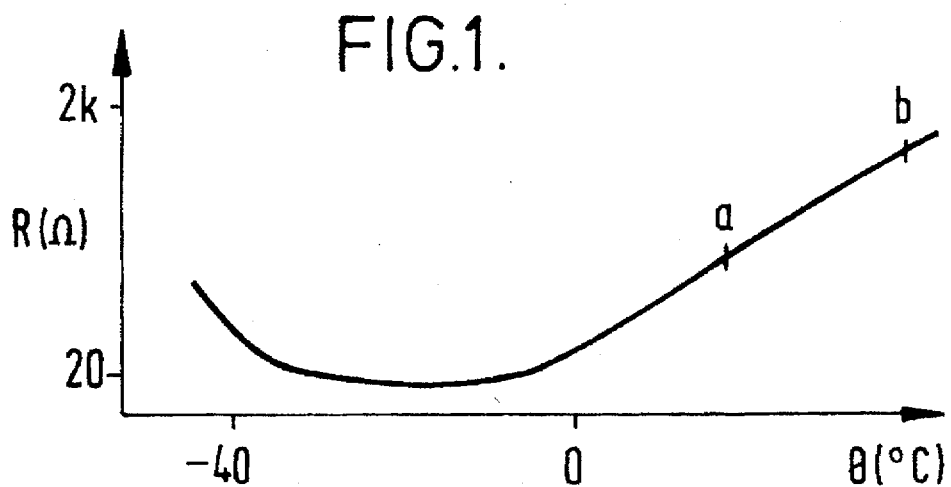
FIG. 1 is a notional temperature/resistance curve for a thermistor.

The transistor 32 is provided with an enabling pulse at its base from the pre-programmed microprocessor 14, which pulse switches the thermistor 26 in and out of the circuit thereby providing enabling signals. The output 36 of the thermistor circuit is a voltage level taken between the collector of the transistor 32 and ground potential. As the temperature of the thermistor 26 rises, its resistance follows the bath-tub curve of FIG. 1. Over most of the thermistor operating range this equates to a more or less steady rise in resistance with temperature. The thermistor 26 is chosen so that its more linear operating characteristic coincides with the temperature range most critical to acceptable operation of the motor. This would be accepted practice by the skilled person. The present invention addresses a situation in which the environment in which the motor is operating extends well outside (in this case below) the critical range and yet the thermistor is still required for monitoring motor temperature. In a refrigerated warehouse or cold store, for example, there will be occasions when the motor 10 is left inoperative in conditions below freezing point such that the thermistor output reflects the climatic temperature until the motor warms up. At the lower sensed temperature levels the resistance of the thermistor would be towards the lower part of the operating curve, i.e. about 20 ohms. This leads to a considerable current drain from the regulated supply in comparison with the current drain when the thermistor resistance is between 500 and 2000 ohms.

Up to now, the regulator had to deal with the highest level of continuous current drain. As a result, the voltage regulator had to be of a capacity sufficient to cope with the current drain through the thermistor at the lowest point on its temperature/resistance curve.

The situation is further exacerbated by the possibility that the battery may recently have been re-charged and, therefore, is particularly healthy, if only for a short but appreciable time, at the same time as current drain through the thermistor is at its heaviest. A 24 V battery may have an actual voltage output range of about 15 to 32 volts. It will be apparent that a higher battery voltage will cause an increased load on the 5 V regulator. The thermistor current drain and the higher battery voltage require the regulator to be sized to cope. A larger capacity regulator takes up significantly more space in a motor compartment in the situation in which space is not in abundance.

According to the invention the current drain on the regulator is limited by pulsing the transistor in order to enable the temperature monitoring by switching the thermistor in and out of circuit. Thus, the power drawn by the thermistor over a given time is limited by the duty cycle of the pulse waveform used. A further benefit is to allow the monitoring circuit components (particularly the resistor 30) also to have smaller power handling capabilities.

In this particular embodiment the microprocessor is programmed to enable the monitoring circuit with a variable duty cycle. As the sensed temperature of the motor rises towards the operating critical range, the duty cycle is increased. At the critical range where temperature monitoring is most important the duty cycle could be 100% i.e. fully 'on'. In the critical range continuous monitoring may be carried out although this need not be used.

Within a predetermined temperature range of particular importance, the duty cycle of the enabling pulses may be increased, although this will increase the power consumption. Alternatively, if a particularly long duration between pulses is used outside an important temperature range, the frequency of the pulses may be increased in that range or as it is approached. While the advantage of the invention lies in pulsing the thermistor to save power it is also possible to enable it continuously in a temperature range where the temperature monitoring is critical.

In an alternative embodiment a fixed pulsing of the monitoring circuit transistor could be employed. For example, a hard limited free running oscillator output could be used to provide regular pulses for enabling the monitoring circuit.

Figure 4A:
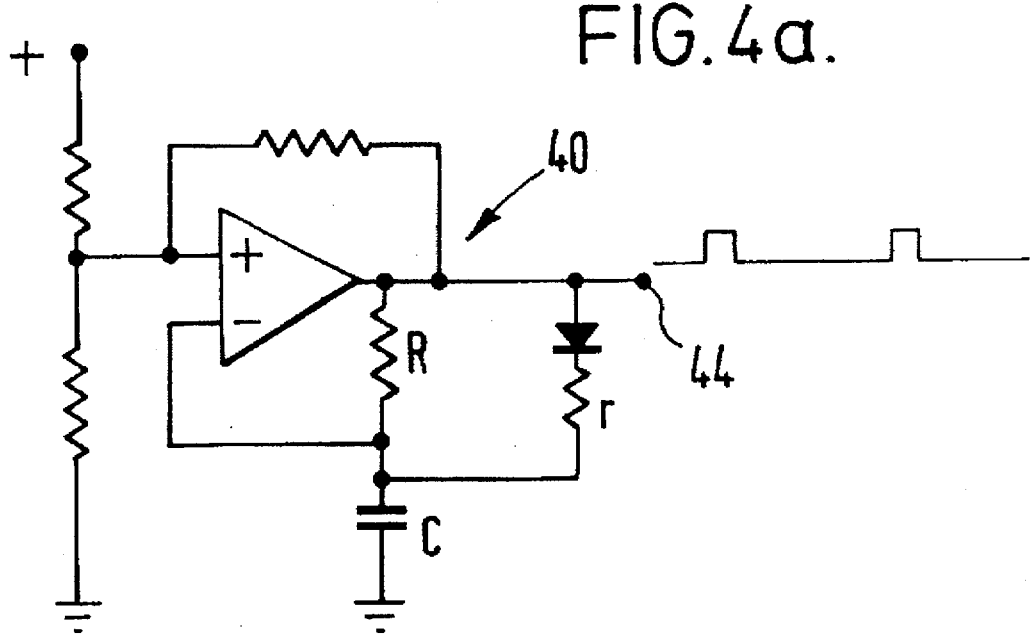
FIG. 4a) and 4b) are circuit diagrams of an alternative form of the invention using an oscillator and a comparator.
Figure 4B:
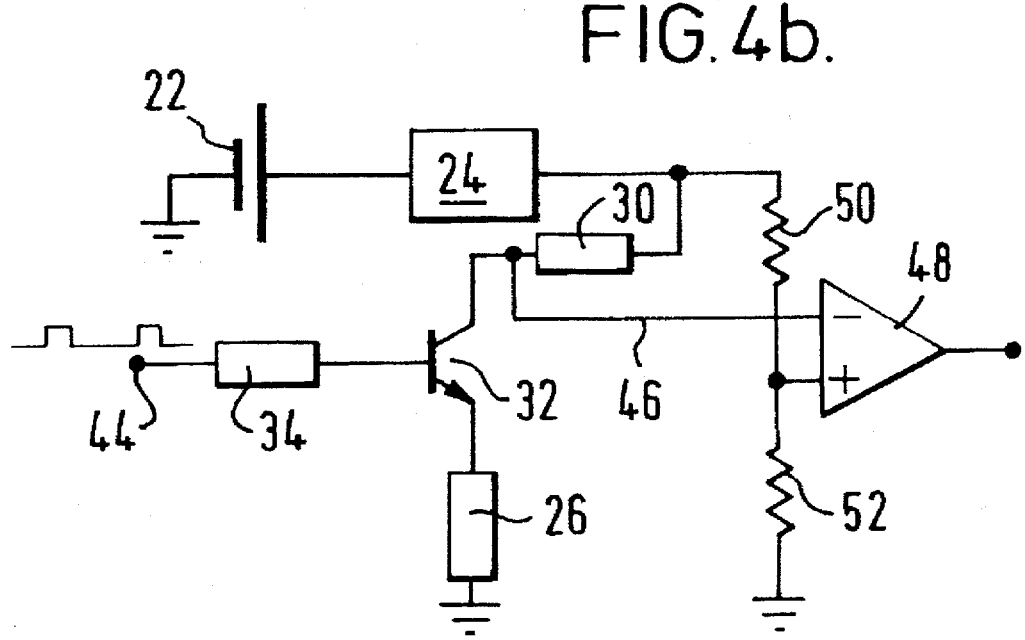

FIG. 4a) shows a pulse generator 40 which provides an enabling pulse output 44 connected with the input to the base of the transistor 32 in FIG. 3. In FIG. 4b) the enabling pulse connects the thermistor 26 with the output of the regulator 24 by causing the transistor to conduct as before. An output 46 from the thermistor potential divider network is connected with an input to a comparator 48 which provides an output when the output of the thermistor enabling circuit exceeds a preset input to the comparator 48. The preset input is set by a further voltage divider comprising resistors 50 and 52 connected to the regulator 24. Thus, a pulse output from the comparator 48 is used as the signal for the processor 14 to effect over temperature switching functions. Again, the thermistor is only enabled for the period of the enabling pulse, thus conserving power. The frequency of the enabling pulses can be changed by altering the values of the resistor r and/or capacitor C in the pulse generator. Similarly, the duration of each pulse can be changed by changing the value of the resistor R.

It will be apparent to one skilled in the art that thermistors with positive temperature coefficients or with negative temperature coefficients could be employed in various embodiments of this invention. While such various embodiments might entail minor revisions to the circuit shown in FIG. 3, the basic method is unchanged.

The invention is particularly described in relation to a switched reluctance motor. It will be readily appreciated by the person of ordinary skill in the art that electric motors, generators or other pieces of electrical or mechanical equipment could employ the same thermistor temperature monitoring circuit to equal effect.

Although the controller described is based on a microprocessor it will be apparent to the skilled person that other forms of controller could be used. For example a hard-wired control board executing a fixed routine is possible or a comparator-based controller could be used.

While the invention has been described in connection with the illustrative embodiments discussed above, those skilled in the art will recognize that many variations may be made without departing from the present invention. Accordingly, the above description of several embodiments is made by way of example and not for purposes of limitation. The present invention is intended to be limited only by the spirit and scope of the following claims.

I claim:

1. A temperature monitoring circuit comprising a temperature sensitive device having an electrical characteristic that varies with temperature, a power supply, an output terminal which provides an electrical output dependent on the temperature of the temperature sensitive device, a switch arrangement for enabling the temperature sensitive device, the switch arrangement being connected between the power supply and the temperature sensitive device, and a controller for actuating the switch arrangement according to repeated enabling pulses, the electrical output of the temperature sensitive device being fed back to controller, the repeated enabling pulses having frequency and duty cycle characteristics, the controller adjusting at least one of the frequency and duty cycle characteristics depending on the electrical output of the temperature sensitive device.

2. A circuit as claimed in claim 1 in which the temperature sensitive device is a thermistor.

3. A circuit as claimed in claim 1 including a potential divider network in which the temperature sensitive device is connected.

4. A circuit as claimed in claim 1 in which the controller is arranged to increase at least one of the pulse frequency and duty cycle as the temperature of the temperature sensitive device increases.

5. A circuit as claimed in claim 1 in which the switch arrangement includes a transistor.

6. A circuit as claimed in claim 1 in which the controller includes a microprocessor.

7. A circuit as claimed in claim 1, being part of a drive system for an electric motor.

8. A circuit as claimed in claim 1 in which the power supply includes a voltage regulator.

9. A temperature monitoring circuit comprising a temperature sensitive device having an electrical characteristic that varies with temperature, a power supply, an output terminal which provides an electrical temperature output dependent on the temperature of the temperature sensitive device, a switch arrangement for enabling the temperature sensitive device, the switch arrangement being connected between the power supply and the temperature sensitive device, and a controller for actuating the switch arrangement according to repeated enabling pulses, such that the repeated enabling pulses occur at a first frequency for temperature outputs outside a predetermined range and the rebated enabling pulses occur at a second frequency for temperature outputs inside the predetermined range.

10. A temperature monitoring circuit comprising a temperature sensitive device having an electrical characteristic that varies with temperature, a power supply, an output terminal which provides an electrical temperature output dependent on the temperature of the temperature sensitive device, a switch arrangement for enabling the temperature sensitive device, the switch arrangement being connected between the power supply and the temperature sensitive device, and a controller for actuating the switch arrangement, such that the controller actuates the switch arrangement according to repeated enabling pulses having a duty cycle for temperature outputs outside a predetermined range and such that the controller actuates the switch arrangement continuously to enable the circuit for temperature outputs inside the predetermined range.

11. A method of monitoring the temperature of a body using a temperature sensitive device having an electrical characteristic that varies with temperature, the method comprising:

(a) connecting the temperature sensitive device to a power supply;

(b) enabling the temperature sensitive device by means of a switch arrangement according to repeated enabling pulses provided by a controller, thus providing a temperature output; and (c) adjusting at least one of the pulse frequency and duty cycle depending on the temperature output.

12. A method as claimed in claim 11 in which the step of connecting the temperature sensitive device to a power supply comprises the step of connecting a thermistor to a power supply.

* * * * *

UNITED STATES PATENT AND TRADEMARK OFFICE
CERTIFICATE OF CORRECTION

PATENT NO : 5,674,008

DATED : October 7, 1997

INVENTOR(S) : Damian Paul Allinson

It is certified that error appears in the above-identified patent and that said Letters Patent is hereby corrected as shown below:

In the claims, in claim 9, column 6, line 24, before "enabling" and following "the", please delete "rebated" and insert therefor --repeated--

Signed and Sealed this

Third Day of February, 1998

BRUCE LEHMAN

Attest:

Attesting Officer

Commissioner of Patents and Trademarks